US007865723B2

(12) United States Patent
Peterka et al.

(10) Patent No.: US 7,865,723 B2
(45) Date of Patent: Jan. 4, 2011

(54) METHOD AND APPARATUS FOR MULTICAST DELIVERY OF PROGRAM INFORMATION

(75) Inventors: Petr Peterka, San Diego, CA (US); Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1172 days.

(21) Appl. No.: 11/201,675

(22) Filed: Aug. 11, 2005

(65) Prior Publication Data

US 2006/0050701 A1 Mar. 9, 2006

Related U.S. Application Data

(60) Provisional application No. 60/604,345, filed on Aug. 25, 2004.

(51) Int. Cl.
*H04L 29/06* (2006.01)
(52) U.S. Cl. ........................... 713/163; 370/390
(58) Field of Classification Search .................. 713/163; 370/390
See application file for complete search history.

(56) References Cited

U.S. PATENT DOCUMENTS

| 6,359,902 | B1 * | 3/2002 | Putzolu ...................... 370/466 |
| 6,760,916 | B2 * | 7/2004 | Holtz et al. .................... 725/34 |
| 7,191,332 | B1 * | 3/2007 | Pankajakshan et al. ...... 713/163 |
| 2002/0048275 | A1 * | 4/2002 | Atwater et al. ............... 370/409 |
| 2004/0181666 | A1 * | 9/2004 | Candelore ..................... 713/160 |
| 2006/0036733 | A1 * | 2/2006 | Fujimoto et al. ............. 709/225 |

OTHER PUBLICATIONS

K. Umschaden et al. "End-to-end Security for Firewall/NAT Traversal within the Session Initiation Protocol (SIP)" Internet Engineering Task Force (Internet Draft); May 2003.*
Handley, Jacobson: RFC 2327—SDP Session Description Protocol, Apr. 1998.
Handley, et al: RFC 2974—Session Announcement Protocol, Oct. 2000.

* cited by examiner

*Primary Examiner*—Kambiz Zand
*Assistant Examiner*—Amare Tabor
(74) *Attorney, Agent, or Firm*—Larry T. Cullen

(57) ABSTRACT

Method and apparatus providing program information to client devices for at least one multicast stream of digital content is described. In one embodiment, session description messages for the at least one multicast stream of digital content are generated. Each of the session description messages includes at least one content access parameter. The at least one content access parameter may include digital rights management (DRM) data, channel key identification data associated with the at least one channel of the at least one multicast stream of digital content, and/or data indicative of whether each session description message is associated with a channel, a program, or a program segment. Each of the session description messages is signed using a cryptographic key. The session description messages are then multicasted to the client devices using a predefined multicast address.

17 Claims, 3 Drawing Sheets

METHOD AND APPARATUS FOR MULTICAST DELIVERY OF PROGRAM INFORMATION

CROSS-REFERENCE TO RELATED APPLICATIONS

This application claims benefit of U.S. provisional patent application Ser. No. 60/604,345, filed Aug. 25, 2004 which is incorporated by reference herein.

BACKGROUND OF THE INVENTION

1. Field of the Invention

The present invention relates to content delivery systems and, more particularly, to a method and apparatus for multicast delivery of program information.

2. Description of the Background Art

Digital content has gained wide acceptance in the public. Such content includes, but is not limited to: movies, videos, music, and the like. Consequently, many consumers and businesses employ various digital media devices or systems that enable the reception of such digital multimedia content via several different communication channels (e.g., a wireless link, such as a satellite link, or a wired link, such as a cable connection). Similarly, the communication channel may also be a telephony based connection, such as DSL and the like. Regardless of the type of channel, the digital content and/or the distribution of the digital content is typically secured using a conditional access (CA) mechanism and a digital rights management (DRM) mechanism (e.g., encryption/decryption using keys).

In some cases, digital content is delivered using a multicast content distribution mechanism, where the same content is delivered to one or more consumers at the same time. Such multicast content distribution is similar to conventional television broadcast systems. In some cases, there may be millions of consumers of a particular multicast streaming session. It is impractical to require each consumer to obtain authorization for viewing digital content delivered by a multicast streaming session using individual point-to-point connections to a conditional access portal. Accordingly, there exists a need in the art for a method and apparatus for multicast delivery of program information capable of providing authorization for viewing digital content.

SUMMARY OF THE INVENTION

Method and apparatus providing program information to client devices for at least one multicast stream of digital content is described. In one embodiment, session description messages for the at least one multicast stream of digital content are generated. Each of the session description messages includes at least one content access parameter. The at least one content access parameter may include digital rights management (DRM) data, channel key identification data associated with the at least one channel of the at least one multicast stream of digital content, and/or data indicative of whether each session description message is associated with a channel, a program, or a program segment. Each of the session description messages is signed using a cryptographic key. The session description messages are then multicasted to the client devices using a predefined multicast address.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Figure 1:
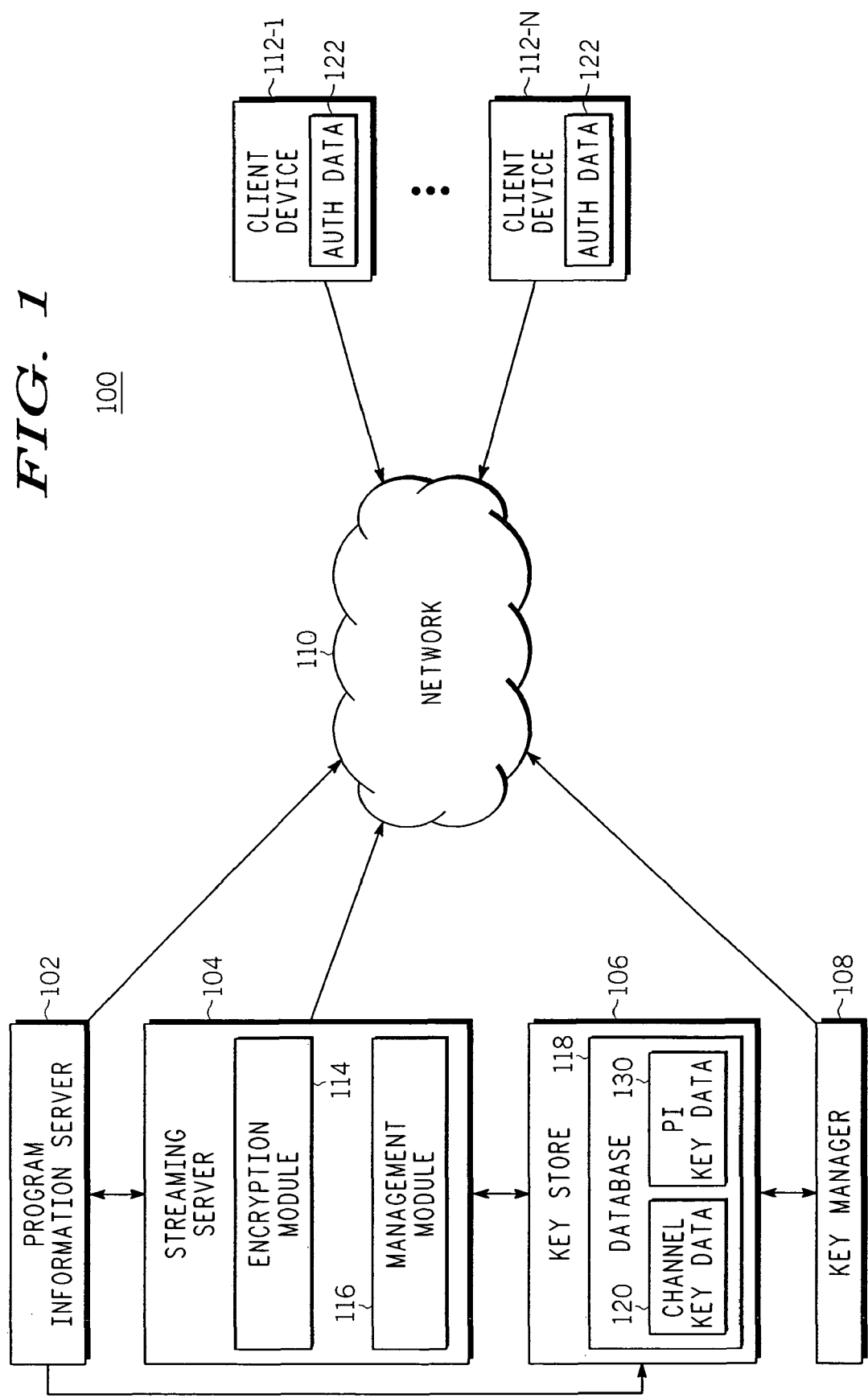
FIG. 1 is a block diagram depicting an exemplary embodiment of a content distribution system constructed in accordance with one or more aspects of the invention.

FIG. 1 is a block diagram depicting an exemplary embodiment of a content distribution system 100 constructed in accordance with one or more aspects of the invention. The content distribution system 100 includes a program information server 102, a content streaming server 104, a key store 106, a key manager 108, a network 110, and client devices 112-1 through 112-N (collectively referred to as client devices 112), where N is an integer greater than one. The content streaming server 104 is configured to provide content to the client devices 112 through the network 110. The program information server 102 is configured to provide program information data associated with the content to the client devices 112 through the network 110. The network 110 may be any type of conventional network known in the art, such as the Internet, a local area network (LAN), a wide area network (WAN), and the like. The client devices 112 may include set top boxes (STBs), media centers, personal video recorder devices, home gateways, computers, cellular telephones, and like type devices for receiving, processing, and/or displaying content.

In one embodiment, the content streaming server 104 initiates one or more multicast secure sessions to deliver content to the client devices 112. "Multicasting" is the transmission or distribution of a single stream (e.g., content) to a select group of recipients (e.g., the client devices 112). During the multicast distribution of content, users of the client devices 112 do not typically initiate the secure streaming session, but instead join a session that is already in progress. In this manner, multicast distribution of content is similar to existing television broadcast distribution. Each multicast secure session may establish one or more channels for conveying content to the client devices 112. Each channel includes one or more programs, where a "program" is a piece of specifically identified content having a beginning and an end. In addition, each channel may include one or more program segments, where a "program segment" is a piece of specifically identified content having start and end times inside a specific program. For example, program segments may be used to identify changes in media streams during commercials (e.g., a movie may be in both English and Japanese, but a commercial is only in Japanese and thus has one less audio stream).

The content streaming server 104 includes an encryption module 114 and a management module 116. The encryption module 114 initiates secure multicast sessions for streaming content and establishes channel key data for each secure session. The channel key data is used by the client devices 112 to access the content. The streaming server 104 initially generates the channel key data and provides it to the key store 106 for storage. A database 118 in the key store 106 is configured to store channel key data 120 for each secure session established by the content streaming server 104. The channel key data 120 may be stored in a secure format within the database 118 (e.g., the channel key data 120 is encrypted and the database records are authenticated). The key manager 108 is configured to access the channel key data 120 in the key store 106, and provide the channel key data 120 to the client devices 112 via the network 110. The client devices 112 use the channel key data to derive content decryption keys for accessing the content. The management module 116 is configured to establish a secure session with the key store 106 for publishing channel key data thereto.

For a given secure multicast session, channel key data produced by the encryption module 114 is identified by a secure session identifier (SSID). Namely, the SSID associates the channel key data with a corresponding channel or group of channels that are protected using the same set of channel key data. In one embodiment, as discussed further below, the client devices 112 obtain SSIDs for channels from a program information stream provided by the program information server 102.

The channel key data may include a sequence of channel keys. Notably, each channel key may be configured to expire after a predetermined period of time, after which the next channel key in the sequence becomes valid. Typically, channel keys are configured to expire frequently in the interest of security. For each secure session, the key manager 108 is configured to distribute a channel key set to the client devices 112 automatically or upon request, where the channel key set includes at least one channel key (e.g., a current channel key and a next channel key). The client devices 112 may request a channel key set from the key manager 108 using the SSID associated with the corresponding channel key data. The key manager 108 distributes the channel key set to a given one of the client devices 112 after validation of authorization data 122 corresponding to the client device (i.e., the key manager 108 only distributes the channel key set to a client device if the client device is authorized to receive the channel keys).

In one embodiment, channel key sets are distributed to the client devices 112 (either automatically or by request) on a random basis or in accordance with an optimization algorithm. Replacement channel key sets are distributed to the client devices 112 prior to expiration of the channel key set currently in use. In one embodiment, replacement channel key sets are automatically distributed to the client devices 112 from the key manager 108 in a random manner. In another embodiment, the client devices 112 are configured to fetch replacement channel key sets at random times. In this manner, the client devices 112 may continuously obtain keys for accessing content from the content streaming server 104.

The program information server 102 initiates a multicast secure session to deliver a program information stream to the client devices 112 via the network 110. In one embodiment, the multicast program information stream is compliant with the well-known session announcement protocol (SAP). The program information stream includes a stream of session description messages that include information related to the content being delivered by the content streaming server 104. In one embodiment, the session description messages in the program information stream are compliant with the well-known session description protocol (SDP). The program information stream includes content access information that allows the client devices 112 to determine if they are authorized to view or to make a recording of the content and then enable the client devices 112 to correctly render the content. The program information server 102 receives data associated with the content for the session description messages from the streaming server 104. Alternatively, the streaming server 104 may generate the session description messages and send them to the program information server 102. The session description messages generally include information required by the client devices 112 to join a multicast session.

In one embodiment, the session description messages in the program information stream include digital rights management (DRM) data. For example, SDP messages may be configured to include DRM data using the standard SDP extension mechanism known in the art. The DRM data in a session description message may include at least one of: content rating data, copy control data, blackout data, and like type DRM attributes known in the art. Each of the client devices 112 is configured to verify DRM data for particular content against its authorization data 122 when a user attempts to access the particular content.

In one embodiment, the program information stream includes separate session description messages corresponding to channels, programs, and/or program segments. Each session description message may include a parameter that dictates whether the message relates to a channel, a program, or a program segment. For example, SDP messages may be configured to include such parameters using the standard SDP extension mechanism known in the art. Notably, the program information stream may include periodic session description messages for each of a plurality of channels. The program information stream may include periodic session description messages for each of a plurality of programs corresponding to a given channel. The program information stream may include periodic session description messages for each of a plurality of program segments corresponding to a given program. Including separate session description messages corresponding to channels, programs, and program segments allows for different DRM data to be used from program to program in a channel, for example.

In one embodiment, session description messages in the program information stream include channel key data identifiers that can be used by the client devices 112 to request channel key sets from the key manager 108. For example, the channel key data identifiers may be the SSIDs associated with channel key data. For example, SDP messages may be configured to include SSID data for channels using the standard SDP extension mechanism known in the art. In this manner, the client devices 112 may be notified as to the required channel keys for content distributed by the content streaming server 104. This allows the client devices 112 to pre-fetch the requisite channel key sets before processing content in particular channels.

It is to be understood that the session description messages may include information in accordance with any of the embodiments described above, or any combination of such embodiments. For example, session description messages may be divided into channel messages, program messages, and program segment messages, and may include both DRM data and channel key identifiers. In general, each of the session description messages includes at least one content access parameter, which may include DRM data, channel key identifiers, and/or data indicative of whether the session description message is associated with a channel, a program, or a program segment.

Since the session description messages in the program information stream carry security-relevant parameters (e.g., DRM data), the session description messages are authenticated before use by the client devices 112. Thus, in one embodiment, each of the session description messages in the program information stream includes authentication data (e.g., a message authentication code (MAC)) that can be used to verify integrity of the message and the source of the message. For example, SDP messages may be configured to include authentication data using the standard SDP extension mechanism known in the art. The authentication data may be generated by the program information server 102 using a shared cryptographic key using various well-known algorithms. In general, each of the session description messages is signed using the shared cryptographic key. The program information server 102 is configured to publish program information key data to the key store 106 that can be used by the client devices 112 to recover the cryptographic key used to produce the authentication data. Thus, the database 118 is configured to store program information (PI) key data 130.

The client devices 112 may obtain program information key data from the key manager 108 in a manner similar to obtaining the channel key data. That is, a set of keys may be automatically distributed to the client devices 112 or may be distributed upon request. The set of keys may include one or more keys, such as a current key and a next key. The key manager 108 distributes the program information key set to a given one of the client devices 112 after validation of the authorization data 122 corresponding to the client device. The client devices 112 may request the key data using the SSID of the program information stream. The SSID for the program information stream may for instance be delivered out of band, as part of device provisioning or it may be a preconfigured value. Replacement key data may be distributed to the client devices 112 on request or automatically in a random fashion or in accordance with an optimization algorithm.

Figure 2:
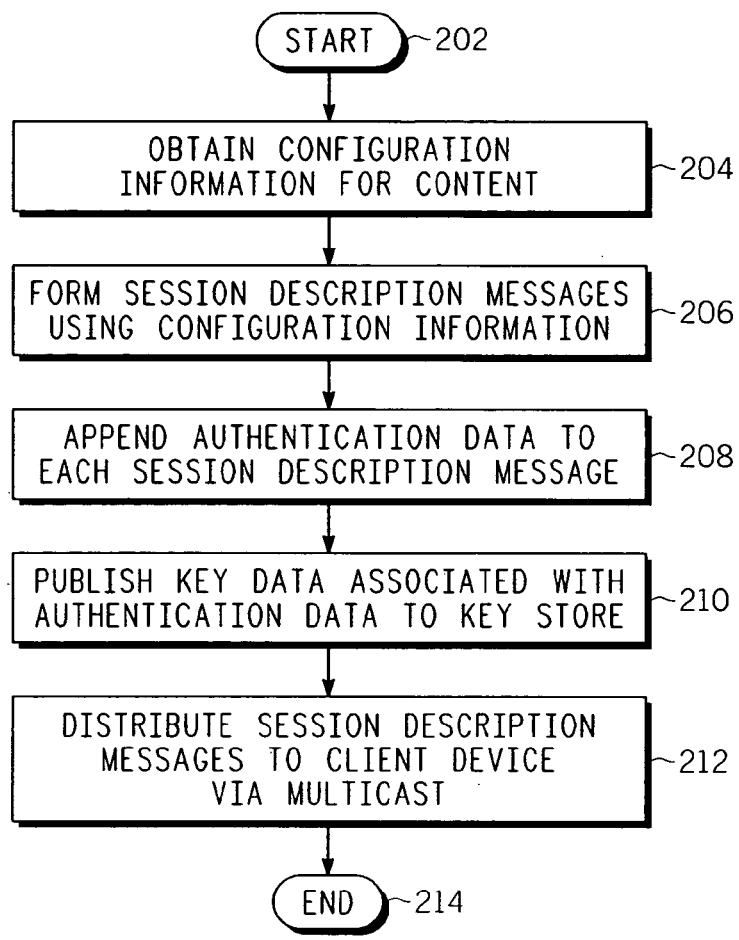
FIG. 2 is a flow diagram depicting an exemplary embodiment of a method for multicast delivery of program information in accordance with one or more aspects of the invention.

FIG. 2 is a flow diagram depicting an exemplary embodiment of a method 200 for multicast delivery of program information in accordance with one or more aspects of the invention. The method 200 begins at step 202. At step 204, configuration information is obtained for content. In one embodiment, the configuration information includes DRM attributes associated with the content and channel key identification data associated with channels providing the content. At step 206, session description messages are formed using the configuration information obtained at step 204. In one embodiment, each session description message includes a parameter that dictates whether the message relates to a channel, a program, or a program segment. Session description messages related to channels may include channel key identification data associated with the channels (e.g., SSIDs). Session description messages associated with programs may include DRM data associated with the programs.

At step 208, authentication data is appended to each of the session description messages formed at step 206. The authentication data may be computed using a shared cryptographic key, as known in the art. At step 210, the program information key data for deriving the shared cryptographic key is published to a key store. At step 212, the session description messages are distributed to the client devices via multicast using a predefined multicast address. The method 200 ends at step 214.

Figure 3:
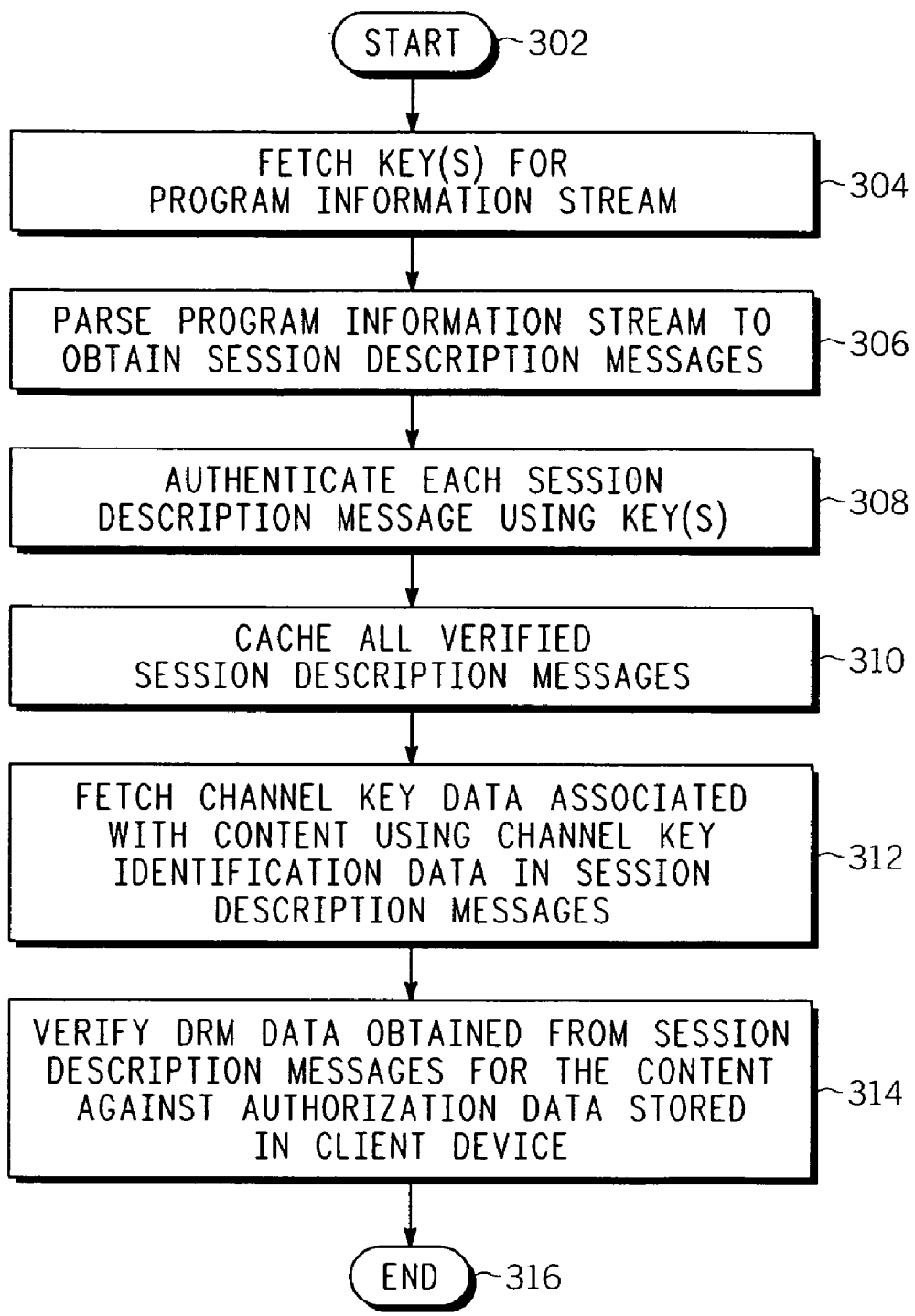
FIG. 3 is a flow diagram depicting an exemplary embodiment of a method for processing a program information stream at a client device in accordance with one or more aspects of the invention.

FIG. 3 is a flow diagram depicting an exemplary embodiment of a method 300 for processing a program information stream at a client device in accordance with one or more aspects of the invention. The method 300 begins at step 302. At step 304, the client device fetches one or more keys associated with the program information stream. At step 306, the client device parses the program information stream to obtain session description messages. At step 308, the client device authenticates each of the session description messages using the key(s) obtained at step 304. At step 310, all verified session description messages are cached. The cached session description messages may be used to access content received by the client device. For example, at step 312, the client device may fetch channel key data associated with content using channel key identification data in the session description messages. At step 314, the client device verifies DRM data obtained from the session description messages for the content against authorization data stored in the client device. The method 300 ends at step 316.

Figure 4:
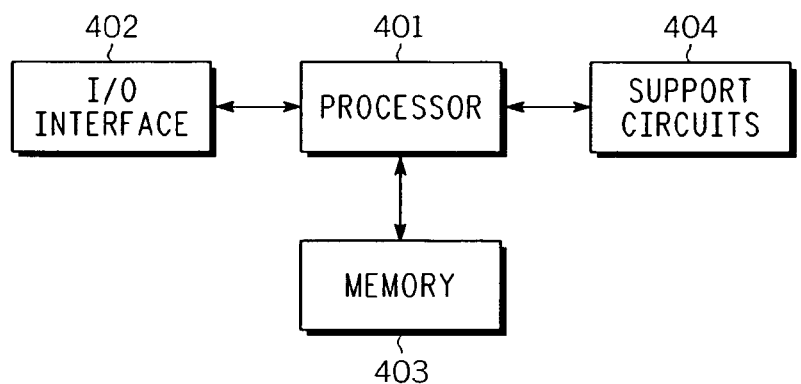
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. The computer 400 includes a processor 401, a memory 403, various support circuits 404, and an I/O interface 402. The processor 401 may be any type of microprocessor known in the art. The support circuits 404 for the processor 401 include conventional cache, power supplies, clock circuits, data registers, I/O interfaces, and the like. The I/O interface 402 may be directly coupled to the memory 403 or coupled through the processor 401.

The memory 403 may store all or portions of one or more programs, program information, and/or data to implement the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to illustrative embodiments of the present invention, other and further embodiments of the invention may be devised without departing from the basic scope thereof, and the scope thereof is determined by the claims that follow.

What is claimed is:

1. A method of providing program information to client devices for a multicast stream of digital content that is being multicast from a first multicast address, comprising:
   generating session description messages for the multicast stream of digital content, each of the session description messages having at least one content access parameter for the multicast stream of digital content, wherein the at least one content access parameter includes channel key identification data associated with a channel of the multicast stream of digital content, and wherein the channel key identification data identifies one or more channel key sets that are securely stored in a server device, and wherein the one or more channel key sets can be used to derive content decryption keys that can be used to decrypt digital content being multicast in the channel;
   signing each of the session description messages using a cryptographic key, comprising
      generating authentication data for each session description message using the cryptographic key, and
      appending the authentication data to each session description message; and
   multicasting the session description messages to the client devices using a second multicast address.

2. The method of claim 1, wherein the at least one content access parameter includes digital rights management (DRM) data.

3. The method of claim 2, wherein the DRM data includes at least one of copy control data, content rating data, and blackout data.

4. The method of claim 1, wherein, for each session description message, the at least one content access parameter includes data indicative of whether the session description message is associated with a channel, a program, or a program segment.

5. The method of claim 1, wherein the authentication data comprises a message authentication code (MAC).

6. Apparatus for providing program information to client devices for a multicast stream of digital content that is being multicast from a first multicast address, comprising:
   means for generating session description messages for the multicast stream digital content, each of the session description messages having at least one content access parameter for the multicast stream of digital content, wherein the at least one content access parameter includes channel key identification data associated with a channel of the multicast stream of digital content, and wherein the channel key identification data identifies one or more channel key sets that are securely stored in a server device, and wherein the one or more channel key sets can be used to derive content decryption keys that can be used to decrypt digital content being multicast in the channel;
   means for signing each of the session description messages using a cryptographic key, comprising
      means for generating authentication data for each session description message using the cryptographic key, and
      means for appending the authentication data to each session description message; and
   means for multicasting the session description messages to the client devices using a second multicast address.

7. The apparatus of claim 6, wherein the at least one content access parameter includes digital rights management (DRM) data.

8. The apparatus of claim 7, wherein the DRM data includes at least one of copy control data, content rating data, and blackout data.

9. The apparatus of claim 6, wherein, for each session description message, the at least one content access parameter includes data indicative of whether the session description message is associated with a channel, a program, or a program segment.

10. The apparatus of claim 6, wherein the authentication data comprises a message authentication code (MAC).

11. A computer readable medium having stored thereon instructions that, when executed by a processor, cause the processor to perform a method of providing program information to client devices for at least one multicast stream of digital content, comprising:
    generating session description messages for the multicast stream of digital content, each of the session description messages having at least one content access parameter for the multicast stream of digital content, wherein the at least one content access parameter includes channel key identification data associated with a channel of the multicast stream of digital content, and wherein the channel key identification data identifies one or more channel key sets that are securely stored in a server device, and wherein the one or more channel key sets can be used to derive content decryption keys that can be used to decrypt digital content being multicast in the channel;
    signing each of the session description messages using a cryptographic key, comprising
       generating authentication data for each session description message using the cryptographic key, and
       appending the authentication data to each session description message; and
    multicasting the session description messages to the client devices using a second multicast address.

12. The computer readable medium of claim 11, wherein the at least one content access parameter includes digital rights management (DRM) data.

13. The computer readable medium of claim 12, wherein the DRM data includes at least one of copy control data, content rating data, and blackout data.

14. The computer readable medium of claim 11, wherein, for each session description message, the at least one content access parameter includes data indicative of whether the session description message is associated with a channel, a program, or a program segment.

15. The method according to claim 1, further comprising:
    receiving the channel key identification data from a client device;
    retrieving one or more securely stored channel key sets; and
    sending the one or more securely stored channel key sets to the client device.

16. The apparatus according to claim 6, further comprising:
    means for receiving the channel key identification data from a client device;
    means for retrieving one or more securely stored channel key sets; and
    means for sending the one or more securely stored channel key sets to the client device.

17. The computer readable medium according to claim 11, wherein the method of providing program information further comprises:

receiving the channel key identification data from a client device;

retrieving one or more securely stored channel key sets; and sending the one or more securely stored channel key sets to the client device.

* * * * *